United States Patent
DiTommaso et al.

(10) Patent No.: US 11,121,736 B2
(45) Date of Patent: Sep. 14, 2021

(54) RADIO FREQUENCY CIRCUIT SUPPORTING CARRIER AGGREGATION

(71) Applicant: Qorvo US, Inc., Greensboro, NC (US)

(72) Inventors: Vincenzo DiTommaso, Portland, OR (US); Peter Richard Molnar, Oak Ridge, NC (US); Jean Briot, Hillsboro, OR (US); Mudar AlJoumayly, Casselberry, FL (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/396,050

(22) Filed: Apr. 26, 2019

(65) Prior Publication Data
US 2020/0343930 A1 Oct. 29, 2020

(51) Int. Cl.
*H04B 1/44* (2006.01)
*H04B 1/00* (2006.01)

(52) U.S. Cl.
CPC ..................... *H04B 1/44* (2013.01)

(58) Field of Classification Search
CPC ................. H04B 1/44; H04B 1/006
See application file for complete search history.

(56) References Cited

U.S. PATENT DOCUMENTS

| | | | |
|---|---|---|---|
| 2011/0210787 A1* | 9/2011 | Lee | H03F 3/68 330/126 |
| 2016/0134414 A1* | 5/2016 | Pehlke | H04L 5/1469 370/280 |
| 2016/0365908 A1* | 12/2016 | Chang | H03F 3/72 |
| 2018/0152945 A1* | 5/2018 | Balteanu | H03F 1/565 |
| 2019/0158137 A1* | 5/2019 | Brunel | H04B 1/04 |
| 2019/0334573 A1* | 10/2019 | Thompson | H04B 1/005 |
| 2020/0014429 A1* | 1/2020 | Leung | H04B 1/04 |
| 2020/0106463 A1* | 4/2020 | Chang | H04L 25/02 |
| 2020/0169285 A1* | 5/2020 | Arfaei Malekzadeh | H03F 1/56 |

* cited by examiner

*Primary Examiner* — Harry H Kim
(74) *Attorney, Agent, or Firm* — Withrow & Terranova, PLLC

(57) ABSTRACT

A radio frequency (RF) circuit is provided. The RF circuit may include a variety of RF filters organized into a number of filter banks and configured to support carrier aggregation (CA) in a variety of band combinations. In examples discussed herein, the RF circuit is configured to utilize separate receive and transmit filters for filtering an RF receive signal and an RF transmit signal in a time-division duplex (TDD) band, respectively. By employing separate receive and transmit filters for the TDD band, as opposed to using an integrated receive-transmit filter, it may be possible to implement the receive and transmit filters in the RF circuit with improved impedance matching, interference rejection, and insertion loss without increasing a footprint of the RF circuit.

19 Claims, 4 Drawing Sheets

RADIO FREQUENCY CIRCUIT SUPPORTING CARRIER AGGREGATION

FIELD OF THE DISCLOSURE

The technology of the disclosure relates generally to a radio frequency (RF) circuit(s) for supporting RF carrier aggregation (CA).

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as long-term evolution (LTE). Particularly in light of carrier aggregation (CA) schemes supported by modern cellular communications networks, a mobile communication device can be configured to simultaneously transmit an outgoing radio frequency (RF) signal(s) in multiple uplink frequency bands, while receiving an incoming RF signal(s) in multiple downlink frequency bands. The uplink and downlink frequency bands supported by a mobile communication device can be generally categorized based on respective frequency spectrums for easy reference. Some of the most commonly referenced frequency band categories include low-band (LB), mid-low-band (MLB), mid-band (MB), and high-band (HB). The LB, the MLB, the MB, and the HB categories typically refer to frequency spectrums between 450-960 MHz, 1452-1496 MHz, 1710-2200 MHz, and 2300-2700 MHz, respectively.

Support for the multiple frequency bands is provided by multiple radio front-ends, each supporting one or more frequency bands. Each radio front-end may include a multiplexer(s) (e.g., a diplexer for the dual-band scenario, a triplexer for a tri-band scenario, a quadplexer for a quad-band scenario, or a pentaplexer for a penta-band scenario) that can be selectively coupled to an antenna port(s). Furthermore, the mobile communication device may include multiple antennas, each coupled to a respective antenna port, to support multiple-input multiple-output (MIMO) and/or RF beamforming operations. In this regard, it may be desired to optimize configurations between the multiple radio front-ends and the multiple antennas to support flexible band combinations without compromising RF performance of the mobile communication device.

SUMMARY

Embodiments of the disclosure include a radio frequency (RF) circuit. The RF circuit may include a variety of RF filters organized into a number of filter banks and configured to support carrier aggregation (CA) in a variety of band combinations. In examples discussed herein, the RF circuit is configured to utilize separate receive and transmit filters for filtering an RF receive signal and an RF transmit signal in a time-division duplex (TDD) band, respectively. By employing separate receive and transmit filters for the TDD band, as opposed to using an integrated receive-transmit filter, it may be possible to implement the receive and transmit filters in the RF circuit with improved impedance matching, interference rejection, and insertion loss without increasing a footprint of the RF circuit.

In one aspect, an RF circuit is provided. The RF circuit includes a TDD receive filter coupled to a TDD band low-noise amplifier (LNA). The TDD receive filter is configured to receive a TDD RF receive signal in a TDD band and pass the TDD RF receive signal to the TDD band LNA. The RF circuit also includes a TDD transmit filter coupled to a high-band power amplifier (PA). The TDD transmit filter is configured to receive a TDD RF transmit signal in the TDD band from the high-band PA and pass the TDD RF transmit signal to a front-end circuit.

In another aspect, an RF circuit is provided. The RF circuit includes a TDD receive filter coupled to a TDD band LNA. The TDD receive filter is configured to receive a TDD RF receive signal in a TDD band and pass the TDD RF receive signal to the TDD band LNA. The RF circuit also includes a first filter bank. The first filter bank includes a first frequency-division duplex (FDD) receive filter(s). The first FDD receive filter(s) is configured to receive at least one first FDD RF receive signal in a first FDD receive band(s) and pass the first FDD RF receive signal(s) to a first FDD band LNA(s). The RF circuit also includes a second filter bank. The second filter bank includes a second FDD receive filter(s). The second FDD receive filter(s) is configured to receive a second FDD RF receive signal(s) in a second FDD receive band(s) and pass the second FDD RF receive signal(s) to a second FDD band LNA(s). The RF circuit also includes a third filter bank. The third filter bank includes a third FDD receive filter(s). The third FDD receive filter(s) is configured to receive a third FDD RF receive signal(s) in a third FDD receive band(s) and pass the third FDD RF receive signal(s) to a third FDD band LNA(s).

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

Figure 1A:
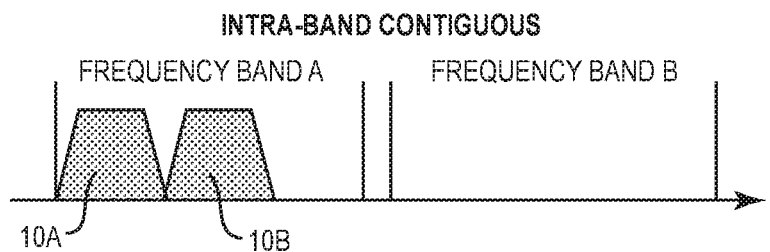
FIG. 1A is a schematic diagram providing an exemplary illustration of intra-band contiguous carrier aggregation.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure include a radio frequency (RF) circuit. The RF circuit may include a variety of RF filters organized into a number of filter banks and configured to support carrier aggregation (CA) in a variety of band combinations. In examples discussed herein, the RF circuit is configured to utilize separate receive and transmit filters for filtering an RF receive signal and an RF transmit signal in a time-division duplex (TDD) band, respectively. By employing separate receive and transmit filters for the TDD band, as opposed to using an integrated receive-transmit filter, it may be possible to implement the receive and transmit filters in the RF circuit with improved impedance matching, interference rejection, and insertion loss without increasing a footprint of the RF circuit.

Figure 1B:
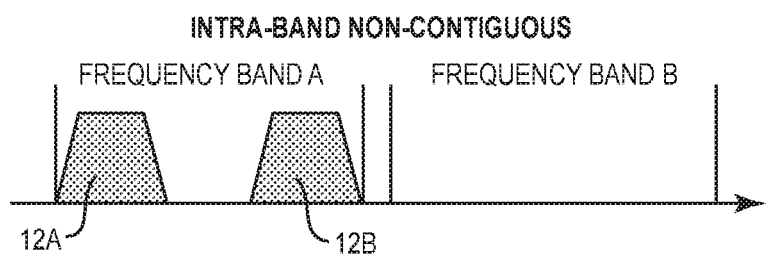
FIG. 1B is a schematic diagram providing an exemplary illustration of intra-band non-contiguous carrier aggregation.
Figure 1C:
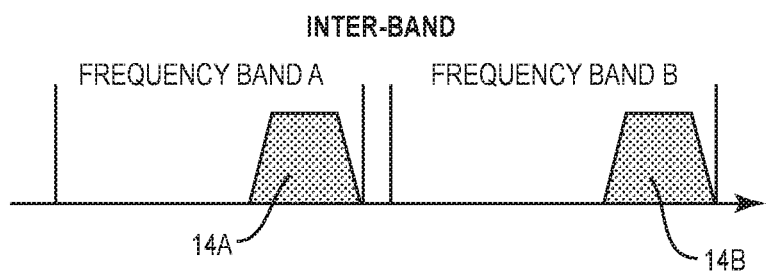
FIG. 1C is a schematic diagram providing an exemplary illustration of inter-band carrier aggregation.

Before discussing an RF circuit of the present disclosure that is configured to support carrier aggregation, an overview of long-term evolution (LTE) Advanced (LTE-Advanced) carrier aggregation technology as defined by the third-generation partnership program (3GPP) is first provided with reference to FIGS. 1A-1C. A brief discussion of an RF circuit employing an integrated receive-transmit filter for filtering a TDD receive signal and a TDD transmit signal, respectively, in a TDD band (e.g., LTE band 41) is then provided with reference to FIG. 2. The discussion of specific exemplary aspects of the RF circuit of the present disclosure starts below with reference to FIG. 3.

In this regard, FIG. 1A is a schematic diagram providing an exemplary illustration of intra-band contiguous carrier aggregation. As the name suggests, carrier aggregation is a technique used to combine multiple LTE component carriers across the available spectrum. Carrier aggregation allows increased data rates and improved network performance in the uplink, downlink, or both. Carrier aggregation can enable aggregations between frequency-division duplex (FDD) and TDD bands, which can provide an attractive combination of low-band or mid-band FDD for good coverage and high-band TDD with more spectrum for higher data rates. For example, a downlink carrier aggregation between FDD downlink band 3 (1805-1880 MHz) and TDD band 41 (2496-2690 MHz) can provide significant improvement in coverage range (via FDD downlink band 3) and data throughout (via TDD band 41). In addition, carrier aggregation can enable aggregations between a licensed band and an unlicensed band, such as the industrial, scientific, and medical (ISM) band.

Intra-band contiguous carrier aggregation is the simplest carrier aggregation deployment scenario, in which multiple adjacent component carriers 10A and 10B in a single frequency band (e.g., frequency band A) are aggregated. Accordingly, a mobile communication device (e.g., a smartphone) can be configured to transmit concurrently in the adjacent component carriers 10A and 10B to enable carrier aggregation and/or receive concurrently in the adjacent component carriers 10A and 10B to enable downlink carrier aggregation.

In regions where spectrum allocation is more fragmented, it may be difficult to support the intra-band contiguous carrier aggregation. In this regard, FIG. 1B is a schematic diagram providing an exemplary illustration of intra-band non-contiguous carrier aggregation. In contrast to the intra-band contiguous carrier aggregation in FIG. 1A, intra-band non-contiguous carrier aggregation aggregates multiple separated component carriers 12A and 12B in a single frequency band (e.g., frequency band A).

FIG. 1C is a schematic diagram providing an exemplary illustration of inter-band carrier aggregation. In contrast to the intra-band contiguous carrier aggregation in FIG. 1A and the intra-band non-contiguous carrier aggregation of FIG. 1B, inter-band carrier aggregation aggregates multiple component carriers 14A and 14B located in different frequency bands (e.g., frequency band A and frequency band B).

Despite the obvious benefits, carrier aggregation also posts unique challenges in RF front-end circuit design and implementation. For example, in carrier aggregation, particularly in the inter-band carrier aggregation, TDD and/or FDD RF signals transmitted in the frequency bands A and B can cause harmonics and/or intermodulation products. As such, it may be necessary to design and implement an RF front-end circuit to suppress and/or isolate the harmonics and/or intermodulation products from RF receivers to ensure sufficient downlink sensitivity.

Figure 2:
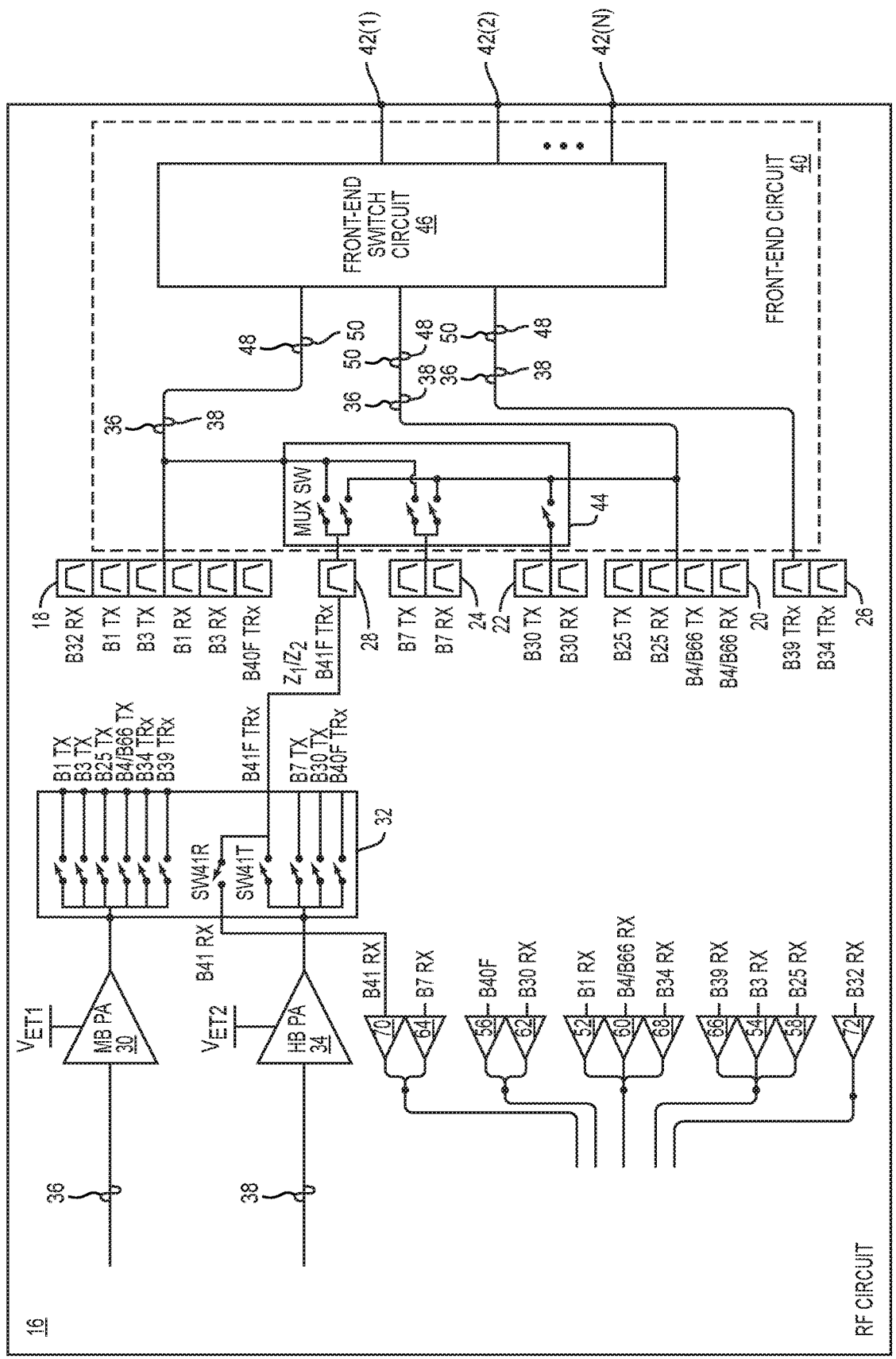
FIG. 2 is a schematic diagram of an exemplary existing radio frequency (RF) circuit configured to support carrier aggregation.

FIG. 2 is a schematic diagram of an exemplary RF circuit 16 configured to support carrier aggregation. The RF circuit 16 includes a first filter bank 18, a second filter bank 20, a third filter bank 22, a fourth filter bank 24, a fifth filter bank 26, and a TDD filter bank 28.

The first filter bank 18 includes an LTE band 1 (LTE-B1) transmit filter (denoted as "B1 TX"), an LTE band 3 (LTE-B3) transmit filter (denoted as "B3 TX"), an LTE-B1 receive filter (denoted as "B1 RX"), an LTE-B3 receiver filter (denoted as "B3 RX"), an LTE band 32 (LTE-B32) receive filter (denoted as "B32 RX"), and an LTE band 40 (LTE-B40) receive-transmit filter (denoted as "B40F TRx"). The second filter bank 20 includes an LTE band 25 (LTE-B25) transmit filter (denoted as "B25 TX"), an LTE-B25 receiver filter (denoted as "B25 RX"), an LTE band 66 (LTE-B66) transmit filter (denoted as "B4/B66 TX"), and an LTE-B66 receive filter (denoted as "B4/B66 RX"). The third filter bank 22 includes an LTE band 30 (LTE-B30) transmit filter (denoted as "B30 TX") and an LTE-B30 receive filter (denoted as "B30 RX"). The fourth filter bank 24 includes an LTE band 7 (LTE-B7) transmit filter (denoted as "B7 TX") and an LTE-B7 receive filter (denoted as "B7 RX"). The fifth filter bank 26 includes an LTE band 39 (LTE-B39) receive-transmit filter (denoted as "B39 TRx") and an LTE-B34 receive-transmit filter (denoted as "B34 TRx"). The TDD filter bank 28 includes an LTE band 41 (LTE-B41) receive-transmit filter (denoted as "B41F TRx").

The LTE-B1 transmit filter, the LTE-B3 transmit filter, the LTE-B25 transmit filter, the LTE-B66 transmit filter, the LTE-B34 receive-transmit filter, and the LTE-B39 receive-transmit filter are coupled to a mid-band power amplifier 30 (denoted as "MB PA") via a back-end switch circuit 32. The back-end switch circuit 32 may include any number and type of switches configured according to any topology as deemed appropriate without changing intended functionalities. The LTE-B41 receive-transmit filter, the LTE-B7 transmit filter, the LTE-B30 transmit filter, and the LTE-B40 receive-transmit filter are coupled to a high-band power amplifier 34 (denoted as "HB PA") via the back-end switch circuit 32.

The mid-band power amplifier 30 is configured to amplify a mid-band RF transmit signal 36, which can be an LTE-B1 RF transmit signal in an LTE-B1 transmit band (1920-1980 MHz), an LTE-B3 RF transmit signal in an LTE-B3 transmit band (1710-1785 MHz), an LTE-B25 RF transmit signal in an LTE-B25 transmit band (1850-1915 MHz), an LTE-B66 RF transmit signal in an LTE-B66 transmit band (1710-1780 MHz), an LTE-B34 RF transmit signal in an LTE-B34 TDD band (2010-2025 MHz), or an LTE-B39 RF transmit signal in an LTE-B39 TDD band (1880-1920 MHz), based on a first envelope tracking (ET) voltage $V_{ET1}$. The high-band power amplifier 34 is configured to amplify a high-band RF transmit signal 38, which can be an LTE-B41 RF transmit signal in an LTE-B41 TDD band (2496-2690 MHz), an LTE-B7 RF transmit signal in an LTE-B7 transmit band (2500-2570 MHz), an LTE-B30 RF transmit signal in an LTE-B30 transmit band (2305-2315 MHz), or an LTE-B40 RF transmit signal in an LTE-B40 TDD band (2300-2400 MHz), based on a second ET voltage $V_{ET2}$. The mid-band power amplifier 30 and the high-band power amplifier 34 may be configured to receive the mid-band RF transmit signal 36 and the high-band RF transmit signal 38 from a transceiver circuit (not shown) coupled to the RF circuit 16.

The RF circuit 16 includes a front-end circuit 40 configured to couple the first filter bank 18, the second filter bank 20, the third filter bank 22, the fourth filter bank 24, and the fifth filter bank 26 to a number of antenna ports 42(1)-42(N). More specifically, the front-end circuit 40 includes a multiplexer circuit 44 and a front-end switch circuit 46. The multiplexer circuit 44 and the front-end switch circuit 46 may include any number and type of switches configured according to any topology as deemed appropriate without changing intended functionalities. The multiplexer circuit 44 is coupled to the first filter bank 18, the second filter bank 20, the third filter bank 22, the fourth filter bank 24, and the TDD filter bank 28. The front-end switch circuit 46 is coupled to the multiplexer circuit 44, the first filter bank 18, the second filter bank 20, the fifth filter bank 26, and the antenna ports 42(1)-42(N). The front-end circuit 40 can be controlled (e.g., by the transceiver circuit) to selectively couple the RF filters in the first filter bank 18, the second filter bank 20, the third filter bank 22, the fourth filter bank 24, the fifth filter bank 26, and the TDD filter bank 28 to one or more of the antenna ports 42(1)-42(N) for transmitting the mid-band RF transmit signal 36 and/or the high-band RF transmit signal 38.

The LTE-B1 transmit filter and the LTE-B3 transmit filter in the first filter bank 18 are configured to pass the mid-band RF transmit signal 36 in the LTE-B1 transmit band and the LTE-B3 transmit band, respectively, to the front-end circuit 40. The LTE-B40 receive-transmit filter in the first filter bank 18 is configured to pass the high-band RF transmit signal 38 in the LTE-B40 TDD band to the front-end circuit 40. The LTE-B25 transmit filter and the LTE-B66 transmit filter in the second filter bank 20 are configured to pass the mid-band RF transmit signal 36 in the LTE-B25 transmit band and the LTE-B66 transmit band, respectively, to the front-end circuit 40. The LTE-B30 transmit filter in the third filter bank 22 is configured to pass the high-band RF transmit signal 38 in the LTE-B30 transmit band to the front-end circuit 40. The LTE-B7 transmit filter in the fourth filter bank 24 is configured to pass the high-band RF transmit signal 38 in the LTE-B7 transmit band to the front-end circuit 40. The LTE-B39 receive-transmit filter and the LTE-B34 receive-transmit filter in the fifth filter bank 26 are configured to pass the mid-band RF transmit signal 36 in the LTE-B39 TDD band and the LTE-B34 TDD band, respectively, to the front-end circuit 40. The TDD receive-transmit filter in the TDD filter bank 28 is configured to pass the high-band RF transmit signal 38 in the LTE-B41 TDD band to the front-end circuit 40. Notably, the front-end circuit 40 may provide concurrently the mid-band RF transmit signal 36 and the high-band RF transmit signal 38 to the antenna ports 42(1)-42(N) when the RF circuit 16 is configured to support carrier aggregation according to any of the carrier aggregation schemes in FIGS. 1A-1C.

The front-end switch circuit 46 can be configured to receive a mid-band RF receive signal 48, which can be an LTE-B1 RF receive signal in an LTE-B1 receive band (2110-2170 MHz), an LTE-B3 RF receive signal in an LTE-B3 receive band (1805-1880 MHz), an LTE-B25 RF receive signal in an LTE-B25 receive band (1930-1995 MHz), an LTE-B66 RF receive signal in an LTE-B66 receive band (2110-2200 MHz), an LTE-B34 RF receive signal in the LTE-B34 TDD band (2010-2025 MHz), an LTE-B39 RF receive signal in the LTE-B39 TDD band (1880-1920 MHz), or an LTE band 32 (LTE-B32) receive signal in the LTE-B32 receive band (1452-1496 MHz) from the antenna ports 42(1)-42(N). The front-end switch circuit 46 can be configured to receive a high-band RF receive signal 50, which can be an LTE-B41 RF receive signal in the LTE-B41 TDD band (2496-2690 MHz), an LTE-B7 RF receive signal in an LTE-B7 receive band (2620-2690 MHz), an LTE-B30 RF receive signal in an LTE-B30 receive band (2350-2360 MHz), or an LTE-B40 RF receive signal in the LTE-B40 TDD band (2300-2400 MHz), from the antenna ports 42(1)-42(N). Notably, the front-end circuit 40 may receive concurrently the mid-band RF receive signal 48 and the high-band RF receive signal 50 from the antenna ports 42(1)-42(N) when the RF circuit 16 is configured to support downlink carrier aggregation according to any of the carrier aggregation schemes in FIGS. 1A-1C.

The LTE-B1 receive filter and the LTE-B3 receive filter in the first filter bank 18 are configured to pass the mid-band RF receive signal 48 in the LTE-B1 receive band and the LTE-B3 receive band to an LTE-B1 low-noise amplifier (LNA) 52 and an LTE-B3 LNA 54, respectively. The LTE-B40 receive-transmit filter in the first filter bank 18 is configured to pass the high-band RF receive signal 50 in the LTE-B40 TDD band to an LTE-B40 LNA 56. The LTE-B25 receive filter and the LTE-B66 receive filter in the second filter bank 20 are configured to pass the mid-band RF receive signal 48 in the LTE-B25 receive band and the LTE-B66 receive band to an LTE-B25 LNA 58 and an LTE-B66 LNA 60, respectively. The LTE-B30 receive filter in the third filter bank 22 is configured to pass the high-band RF receive signal 50 in the LTE-B30 receive band to an LTE-B30 LNA 62. The LTE-B7 receive filter in the fourth filter bank 24 is configured to pass the high-band RF receive signal 50 in the LTE-B7 receive band to an LTE-B7 LNA 64. The LTE-B39 receive-transmit filter and the LTE-B34 receive-transmit filter in the fifth filter bank 26 are configured to pass the mid-band RF receive signal 48 in the LTE-B39 TDD band and the LTE-B34 TDD band to an LTE-B39 LNA 66 and an LTE-B34 LNA 68, respectively. The TDD receive-transmit filter in the TDD filter bank 28 is configured to pass the high-band RF receive signal 50 in the LTE-B41 TDD band to an LTE-B41 LNA 70. The LTE-B32 receive filter in the first filter bank 18 is configured to pass the mid-band RF receive signal 48 in the LTE-B32 receive band to an LTE-B32 LNA 72. The LTE-B1 LNA 52, the LTE-B3 LNA 54, the LTE-B40 LNA 56, the LTE-B25 LNA 58, the LTE-B66 LNA 60, the LTE-B30 LNA 62, the LTE-B7 LNA 64, the LTE-B39 LNA 66, the LTE-B34 LNA 68, the LTE-B41 LNA 70, and the LTE-B32 LNA 72 may provide the mid-band RF receive signal 48 and/or the high-band RF receive signal 50 to a coupled transceiver circuit (not shown).

Notably, the LTE-B41 receive-transmit filter in the TDD filter bank 28 may be an integrated circuit configured to pass the high-band RF transmit signal 38 and the high-band RF receive signal 50 in the LTE-B41 TDD band based on a TDD transmit-receive schedule. As such, it may be challenging to optimize the LTE-B41 receive-transmit filter to meet many stringent requirements for carrier aggregation.

In one example, to prevent the LTE-B41 LNA from being de-sensed/saturated during downlink carrier aggregation, the LTE-B41 receive-transmit filter needs to sufficiently suppress RF interferences, intermodulation products, and/or harmonics caused by the mid-band RF transmit signal 36 and/or the high-band RF transmit signal 38 in such LTE transmit bands as LTE-B1 transmit band, LTE-B3 transmit band, LTE-B25 transmit band, and LTE-B66 transmit band. Furthermore, during downlink carrier aggregation, the LTE-B41 receive-transmit filter needs to sufficiently suppress RF interferences, intermodulation products, and/or harmonics caused by the mid-band RF receive signal 48 and/or the high-band RF receive signal 50 in such LTE receive bands as LTE-B1 receive band, LTE-B3 receive band, LTE-B25 receive band, and LTE-B66 receive band. In this regard, the LTE-B41 receive-transmit filter may bear a double-duty in suppressing RF interferences, intermodulation products, and/or harmonics caused by all FDD transmit and receive bands. On the other hand, to prevent the LTE-B1 LNA 52, the LTE-B3 LNA 54, the LTE-B25 LNA 58, and the LTE-B66 LNA 60 from being de-sensed/saturated, the LTE-B41 receive-transmit filter also needs to sufficiently suppress RF interferences caused by the LTE-B41 RF transmit signal. The multi-requirement for the LTE-B41 receive-transmit filter with respect to RF interferences, intermodulation products, and/or harmonics suppression may lead to increased complexity and/or footprint of the LTE-B41 receive-transmit filter.

In another example, to help improve efficiency and/or linearity of the high-band power amplifier 34 and the LTE-B41 LNA 70, it may be desired for the LTE-B41 receive-transmit filter to present a desired power amplifier (PA) impedance $Z_1$ and a desired LNA impedance $Z_2$ to the high-band power amplifier 34 and the LTE-B41 LNA 70, respectively. In a non-limiting example, the desired PA impedance $Z_1$ can equal approximately 55+j10Ω and the desired LNA impedance $Z_2$ can equal approximately 40+j10Ω.

In a non-limiting example, an insertion loss (IL) figure can be an important figure-of-merit for the LTE-B41 receive-transmit filter. The IL of the LTE-B41 receive-transmit filter is typically determined based on a 50Ω source and load impedance that is different from the desired PA impedance $Z_1$ and the desired LNA impedance $Z_2$. In this regard, to configure the LTE-B41 receive-transmit filter to match the desired PA impedance $Z_1$ or the desired LNA impedance $Z_2$, it may be necessary to compromise on the IL figure of the LTE-B41 receive-transmit filter. Thus, it may be very challenging to configure the LTE-B41 receive-transmit filter to match concurrently the desired PA impedance $Z_1$ or the desired LNA impedance $Z_2$.

In the RF circuit 16, the TDD filter bank 28 is coupled to the high-band power amplifier 34 and the LTE-B41 LNA 70 via switches SW41T and SW41R, respectively. Notably, the switch SW41R may cause additional insertion loss to the LTE-B41 RF receive signal and further alter the desired LNA impedance $Z_2$. As such, it may be desired to optimize the LTE-B41 receive-transmit filter to improve impedance matching, interference rejection, and insertion loss without increasing a footprint of the RF circuit 16.

Figure 3:
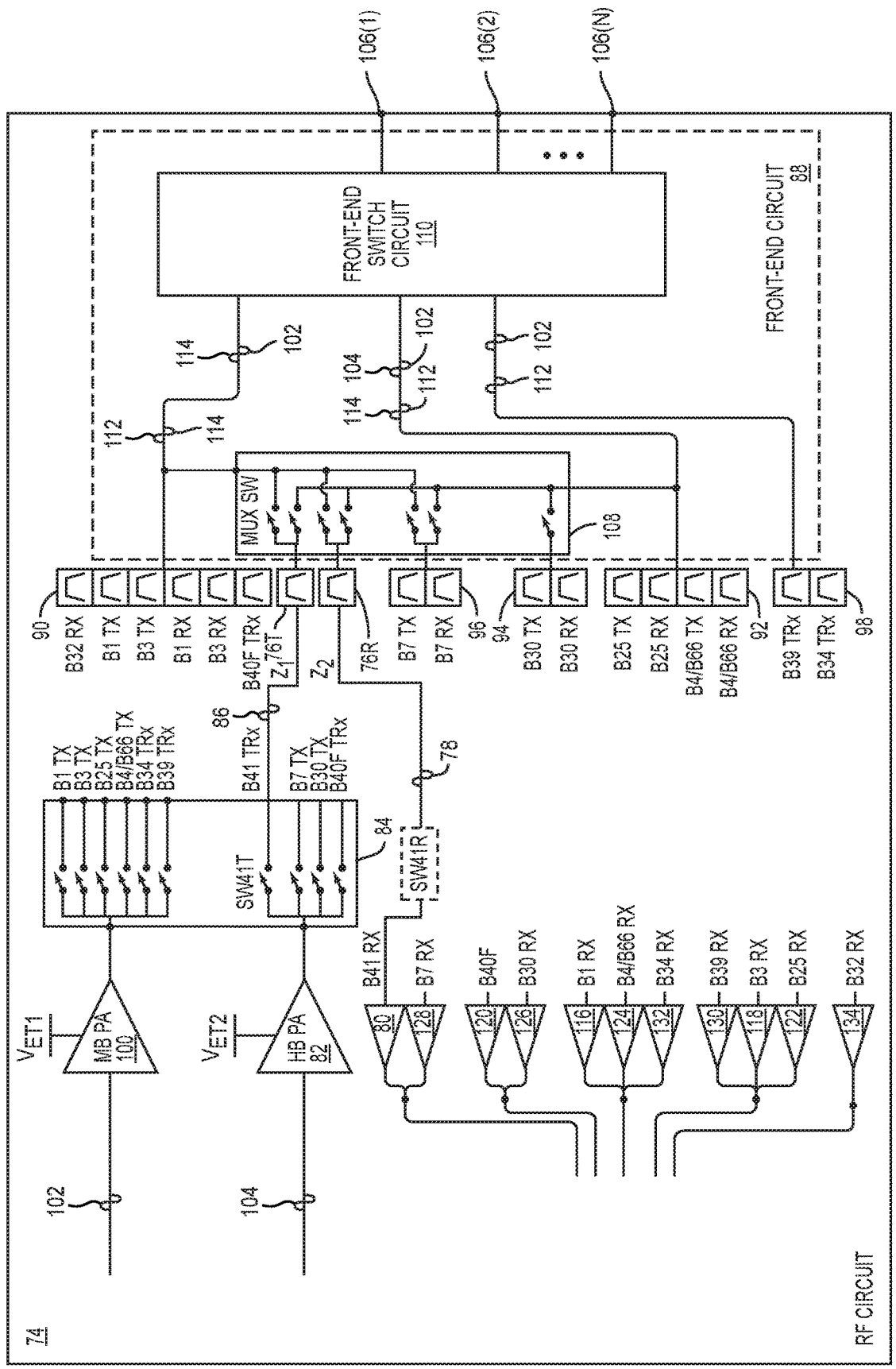
FIG. 3 is a schematic diagram of an exemplary RF circuit configured according to an embodiment of the present disclosure to employ a time-division duplex (TDD) receive filter and a TDD transmit filter to support carrier aggregation with improved impedance matching, interference rejection, and insertion loss.

In this regard, FIG. 3 is a schematic diagram of an exemplary RF circuit 74 configured according to an embodiment of the present disclosure to employ a TDD receive filter 76R and a TDD transmit filter 76T to support carrier aggregation with improved impedance matching, interference rejection, and insertion loss. The TDD receive filter 76R and the TDD transmit filter 76T may be provided in separate dies. Alternatively, it may also be possible to integrate the TDD receive filter 76R and the TDD transmit filter 76T into a single die.

In a non-limiting example, the TDD receive filter 76R and the TDD transmit filter 76T may be configured to replace the TDD filter bank 28 in the RF circuit 16. As discussed in detail below, the TDD receive filter 76R and the TDD transmit filter 76T can be functionally independent from each other. As a result, it may be possible to optimize each of the TDD receive filter 76R and the TDD transmit filter 76T based on respective insertion loss, interference rejection, and impedance match requirements, thus helping to improve the overall performance and footprint of the RF circuit 74.

The TDD receive filter 76R is configured to pass a TDD RF receive signal 78 in a TDD band to a TDD band LNA 80 (also known as "LTE B41 LNA"). In contrast to the LTE-B41 receive-transmit filter in the RF circuit 16 of FIG. 2, the TDD receive filter 76R is configured to connect directly to the TDD band LNA 80 (e.g., via a conductive trace) without going through any switch (e.g., the switch SW41R in FIG. 2). Although it may be desired to connect the TDD receive filter 76R directly to the TDD band LNA 80 without going through any switch, it should be appreciated that it may also be possible to couple the TDD receive filter 76R to the TDD band LNA 80 via a TDD receive switch SW41R, such as a low-loss microelectromechanical systems (MEMS) switch or a silicon-on-insulator (SOI) switch, without affecting operational principles of the TDD receive filter 76R. As such, it may be possible to reduce the additional insertion loss between the TDD receive filter 76R and the TDD band LNA 80 by approximately 0.6 dB. Further, by separating the TDD receive filter 76R from the TDD transmit filter 76T, the TDD receive filter 76R is only required to reject interferences, intermodulation products, and/or harmonics associated with certain LTE transmit bands (e.g., LTE-B1 transmit band, LTE-B3 transmit band, LTE-B25 transmit band, LTE-B66 transmit band, etc.). In this regard, the TDD receive filter 76R may be relieved from the duty of having to suppress RF interferences, intermodulation products, and/or harmonics caused by the mid-band RF receive signal 48 and/or the high-band RF receive signal 50 in such LTE receive bands as LTE-B1 receive band, LTE-B3 receive band, LTE-B25 receive band, and LTE-B66 receive band. As such, it may be possible to implement the TDD receive filter 76R with lower rejection requirements. As a result, it may be possible to further reduce inherent insertion loss of the TDD receive filter 76R by approximately 0.4 dB. In this regard, by connecting the TDD receive filter 76R directly to the TDD band LNA 80 and separating the TDD receive filter 76R from the TDD transmit filter 76T, it may be possible to achieve a combined insertion loss reduction of approximately 1 dB.

The TDD transmit filter 76T is coupled to a high-band power amplifier 82 (denoted as "HB PA") via a back-end switch circuit 84. The back-end switch circuit 84 may include any number and type of switches configured according to any topology as deemed appropriate without changing intended functionalities. The back-end switch circuit 84 includes a TDD transmit switch SW41T configured to couple the TDD transmit filter 76T to the high-band power amplifier 82. In a non-limiting example, the TDD receive switch SW41R is provided outside the back-end switch circuit 84. In other words, the switch SW41R coupled to the TDD receive filter 76R is independent from the TDD transmit switch SW41T coupled to the TDD transmit filter 76T. The TDD transmit filter 76T is configured to pass a TDD RF transmit signal 86 in the TDD band to a front-end circuit 88. By separating the TDD transmit filter 76T from the TDD receive filter 76R, the TDD transmit filter 76T is only required to reject interferences, intermodulation products, and/or harmonics associated with certain LTE receive bands (e.g., LTE-B1 receive band, LTE-B3 receive band, LTE-B25 receive band, LTE-B66 receive band, etc.). In this regard, the TDD transmit filter 76T may be relieved from the duty of having to suppress RF interferences, intermodulation products, and/or harmonics caused by the mid-band RF transmit signal 36 and/or the high-band RF transmit signal 38 in such LTE transmit bands as LTE-B1 transmit band, LTE-B3 transmit band, LTE-B25 transmit band, and LTE-B66 transmit band. As such, it may be possible to implement the TDD transmit filter 76T with lower rejection requirements. As a result, it may be possible to further reduce inherent insertion loss of the TDD transmit filter 76T by approximately 0.4 dB.

To help improve efficiency and/or linearity of the high-band power amplifier 82 and the TDD band LNA 80, it may be desired to present a desired PA impedance $Z_1$ and a desired LNA impedance $Z_2$ to the high-band power amplifier 82 and the TDD band LNA 80, respectively. In a non-limiting example, the desired PA impedance $Z_1$ can equal approximately 55+j10Ω and the desired LNA impedance $Z_2$ can equal approximately 40+j10Ω. Thus, by separating the TDD transmit filter 76T from the TDD receive filter 76R, it may also be possible to configure the TDD transmit filter 76T and the TDD receive filter 76R to concurrently present the desired PA impedance $Z_1$ and the desired LNA impedance $Z_2$ to the high-band power amplifier 82 and the TDD band LNA 80, respectively. As a result, it may be possible to improve efficiency and/or linearity of the high-band power amplifier 82 and the TDD band LNA 80.

In examples discussed hereinafter, the TDD receive filter 76R and the TDD transmit filter 76T can be an LTE-B41 receive filter and an LTE-B41 transmit filter, respectively. Accordingly, the TDD receive filter 76R is configured to pass the TDD RF receive signal 78, which will be an LTE-B41 RF receive signal in an LTE-B41 band (2496-2690 MHz), to the TDD band LNA 80 that functions as an LTE-B41 LNA. Likewise, the TDD transmit filter 76T is configured to pass the TDD RF transmit signal 86, which will be an LTE-B41 RF transmit signal in the LTE-B41 band (2496-2690 MHz), to the front-end circuit 88.

In addition to the TDD receive filter 76R and the TDD transmit filter 76T, the RF circuit 74 may further include a first filter bank 90, a second filter bank 92, a third filter bank 94, a fourth filter bank 96, and a fifth filter bank 98. In examples discussed hereinafter, the first filter bank 90 includes an LTE band 1 (LTE-B1) transmit filter (denoted as "B1 TX"), an LTE band 3 (LTE-B3) transmit filter (denoted as "B3 TX"), an LTE-B1 receive filter (denoted as "B1 RX"), an LTE-B3 receiver filter (denoted as "B3 RX"), an LTE band 32 (LTE-B32) receive filter (denoted as "B32 RX"), and an LTE band 40 (LTE-B40) receive-transmit filter (denoted as "B40F TRx"). The second filter bank 92 includes an LTE band 25 (LTE-B25) transmit filter (denoted as "B25 TX"), an LTE-B25 receiver filter (denoted as "B25 RX"), an LTE band 66 (LTE-B66) transmit filter (denoted as "B4/B66 TX"), and an LTE-B66 receive filter (denoted as "B4/B66 RX"). Notably, the LTE-B66 transmit filter and the LTE-B66 receive filter can concurrently function as an LTE band 4 (LTE-B4) transmit filter and an LTE-B4 receive filter, respectively. The third filter bank 94 includes an LTE band 30 (LTE-B30) transmit filter (denoted as "B30 TX") and an LTE-B30 receive filter (denoted as "B30 RX"). The fourth filter bank 96 includes an LTE band 7 (LTE-B7) transmit filter (denoted as "B7 TX") and an LTE-B7 receive filter (denoted as "B7 RX"). The fifth filter bank 98 includes an LTE band 39 (LTE-B39) receive-transmit filter (denoted as "B39 TRx") and an LTE-B34 receive-transmit filter (denoted as "B34 TRx").

The LTE-B1 transmit filter, the LTE-B3 transmit filter, the LTE-B25 transmit filter, the LTE-B4/B66 transmit filter, the LTE-B34 receive-transmit filter, and the LTE-B39 receive-transmit filter are coupled to a mid-band power amplifier 100 (denoted as "MB PA") via the back-end switch circuit 84. The LTE-B7 transmit filter, the LTE-B30 transmit filter, and the LTE-B40 receive-transmit filter are coupled to the high-band power amplifier 82 via the back-end switch circuit 84.

The mid-band power amplifier 100 is configured to amplify a mid-band RF transmit signal 102, which can be an LTE-B1 RF transmit signal in an LTE-B1 transmit band (1920-1980 MHz), an LTE-B3 RF transmit signal in an LTE-B3 transmit band (1710-1785 MHz), an LTE-B25 RF transmit signal in an LTE-B25 transmit band (1850-1915 MHz), an LTE-B66 RF transmit signal in an LTE-B66 transmit band (1710-1780 MHz), an LTE-B34 RF transmit signal in an LTE-B34 band (2010-2025 MHz), or an LTE-B39 RF transmit signal in an LTE-B39 band (1880-1920 MHz), based on a first ET voltage $V_{ET1}$. The high-band power amplifier 82 is configured to amplify a high-band RF transmit signal 104, which can be the TDD RF transmit signal 86 in the LTE-B41 band (2496-2690 MHz), an LTE-B7 RF transmit signal in an LTE-B7 transmit band (2500-2570 MHz), an LTE-B30 RF transmit signal in an LTE-B30 transmit band (2305-2315 MHz), or an LTE-B40 RF transmit signal in an LTE-B40 band (2300-2400 MHz), based on a second ET voltage $V_{ET2}$. The mid-band power amplifier 100 and the high-band power amplifier 82 may be configured to receive the mid-band RF transmit signal 102 and the high-band RF transmit signal 104 from a transceiver circuit (not shown) coupled to the RF circuit 74.

The first filter bank 18, the second filter bank 20, the third filter bank 22, the fourth filter bank 24, and the fifth filter bank 26 are coupled to a number of antenna ports 106(1)-106(N) via the front-end circuit 88. The front-end circuit 88 includes a multiplexer circuit 108 and a front-end switch circuit 110. The multiplexer circuit 108 and the front-end switch circuit 110 may include any number and type of switches configured according to any topology as deemed appropriate without changing intended functionalities. The multiplexer circuit 108 is coupled to the first filter bank 90, the second filter bank 92, the third filter bank 94, the fourth filter bank 96, the TDD receive filter 76R, and the TDD transmit filter 76T. The front-end switch circuit 110 is coupled to the multiplexer circuit 108, the first filter bank 90, the second filter bank 92, the fifth filter bank 98, and the antenna ports 106(1)-106(N). The front-end circuit 88 can be controlled (e.g., by the transceiver circuit) to selectively couple the TDD receive filter 76R, the TDD transmit filter 76T, and any of the RF filters in the first filter bank 90, the second filter bank 92, the third filter bank 94, the fourth filter bank 96, and the fifth filter bank 98 to one or more of the antenna ports 106(1)-106(N) for transmitting the mid-band RF transmit signal 102 and/or the high-band RF transmit signal 104.

The LTE-B1 transmit filter and the LTE-B3 transmit filter in the first filter bank 90 are configured to pass the mid-band RF transmit signal 102 in the LTE-B1 transmit band and the LTE-B3 transmit band, respectively, to the front-end circuit 88. The LTE-B40 receive-transmit filter in the first filter bank 90 is configured to pass the high-band RF transmit signal 104 in the LTE-B40 band to the front-end circuit 88. The LTE-B25 transmit filter and the LTE-B66 transmit filter in the second filter bank 92 are configured to pass the mid-band RF transmit signal 102 in the LTE-B25 transmit band and the LTE-B66 transmit band, respectively, to the front-end circuit 88. The LTE-B30 transmit filter in the third filter bank 94 is configured to pass the high-band RF transmit signal 104 in the LTE-B30 transmit band to the front-end circuit 88. The LTE-B7 transmit filter in the fourth filter bank 96 is configured to pass the high-band RF transmit signal 104 in the LTE-B7 transmit band to the front-end circuit 88. The LTE-B39 receive-transmit filter and the LTE-B34 receive-transmit filter in the fifth filter bank 98 are configured to pass the mid-band RF transmit signal 102 in the LTE-B39 band and the LTE-B34 band, respectively, to the front-end circuit 88. Notably, the front-end circuit 88 may provide concurrently the mid-band RF transmit signal 102 and the high-band RF transmit signal 104 to the antenna ports 106(1)-106(N) when the RF circuit 74 is configured to support carrier aggregation according to any of the carrier aggregation schemes in FIGS. 1A-1C.

The front-end switch circuit 110 can be configured to receive a mid-band RF receive signal 112, which can be an LTE-B1 RF receive signal in an LTE-B1 receive band (2110-2170 MHz), an LTE-B3 RF receive signal in an LTE-B3 receive band (1805-1880 MHz), an LTE-B25 RF receive signal in an LTE-B25 receive band (1930-1995 MHz), an LTE-B66 RF receive signal in an LTE-B66 receive band (2110-2200 MHz), an LTE-B34 RF receive signal in the LTE-B34 band (2010-2025 MHz), an LTE-B39 RF receive signal in the LTE-B39 band (1880-1920 MHz), or an LTE band 32 (LTE-B32) receive signal in the LTE-B32 receive band (1452-1496 MHz) from the antenna ports 106(1)-106(N). The front-end switch circuit 110 can be configured to receive a high-band RF receive signal 114, which can be the TDD RF receive signal 78 in the LTE-B41 band (2496-2690 MHz), an LTE-B7 RF receive signal in an LTE-B7 receive band (2620-2690 MHz), an LTE-B30 RF receive signal in an LTE-B30 receive band (2350-2360 MHz), or an LTE-B40 RF receive signal in the LTE-B40 band (2300-2400 MHz), from the antenna ports 106(1)-106 (N). Notably, the front-end switch circuit 110 may receive concurrently the mid-band RF receive signal 112 and the high-band RF receive signal 114 from the antenna ports 106(1)-106(N) when the RF circuit 74 is configured to support downlink carrier aggregation according to any of the carrier aggregation schemes in FIGS. 1A-1C. In this regard, in support for carrier aggregation, the TDD receive filter 76R may receive the TDD RF receive signal 78 concurrent to a selected FDD receive filter among the LTE-B1 receive filter, the LTE-B3 receive filter, the LTE-B25 receive filter, the LTE-B66 receive filter, and the LTE-B30 receive filter being configured to receive a selected FDD RF receive signal in a selected FDD receive band among the LTE-B1 receive band, the LTE-B3 receive band, the LTE-B25 receive band, the LTE-B66 receive band, and the LTE-B30 receive band.

The LTE-B1 receive filter and the LTE-B3 receive filter in the first filter bank 90 are configured to pass the mid-band RF receive signal 112 in the LTE-B1 receive band and the LTE-B3 receive band to an LTE-B1 LNA 116 and an LTE-B3 LNA 118, respectively. The LTE-B40 receive-transmit filter in the first filter bank 90 is configured to pass the high-band RF receive signal 114 in the LTE-B40 band to an LTE-B40 LNA 120. The LTE-B25 receive filter and the LTE-B66 receive filter in the second filter bank 92 are configured to pass the mid-band RF receive signal 112 in the LTE-B25 receive band and the LTE-B66 receive band to an LTE-B25 LNA 122 and an LTE-B66 LNA 124, respectively. The LTE-B30 receive filter in the third filter bank 94 is configured to pass the high-band RF receive signal 114 in the LTE-B30 receive band to an LTE-B30 LNA 126. The LTE-B7 receive filter in the fourth filter bank 96 is configured to pass the high-band RF receive signal 114 in the LTE-B7 receive band to an LTE-B7 LNA 128. The LTE-B39 receive-transmit filter and the LTE-B34 receive-transmit filter in the fifth filter bank 98 are configured to pass the mid-band RF receive signal 112 in the LTE-B39 band and the LTE-B34 band to an LTE-B39 LNA 130 and an LTE-B34 LNA 132, respectively. The LTE-B32 receive filter in the first filter bank 90 is configured to pass the mid-band RF receive signal 112 in the LTE-B32 receive band to an LTE-B32 LNA 134. The TDD band LNA 80, LTE-B1 LNA 116, the LTE-B3 LNA 118, the LTE-B40 LNA 120, the LTE-B25 LNA 122, the LTE-B66 LNA 124, the LTE-B30 LNA 126, the LTE-B7 LNA 128, the LTE-B39 LNA 130, the LTE-B34 LNA 132, and the LTE-B32 LNA 134 may provide the mid-band RF receive signal 112 and/or the high-band RF receive signal 114 to a coupled transceiver circuit (not shown).

Notably, it may be possible to split the LTE B40 receive-transmit filter in the first filter bank 90 into an LTE B40 receive filter (not shown) and an LTE B40 transmit filter (not shown). In this regard, it may be possible to couple the LTE B40 receive filter directly to the LTE-B40 LNA 120 to provide the high-band RF receive signal 114 in the LTE-B40 band to the LTE-B40 LNA 120. Likewise, the LTE-B40 transmit filter may be configured to receive and pass the high-band RF transmit signal 104 in the LTE-B40 band to the front-end circuit 88.

Figure 4A:
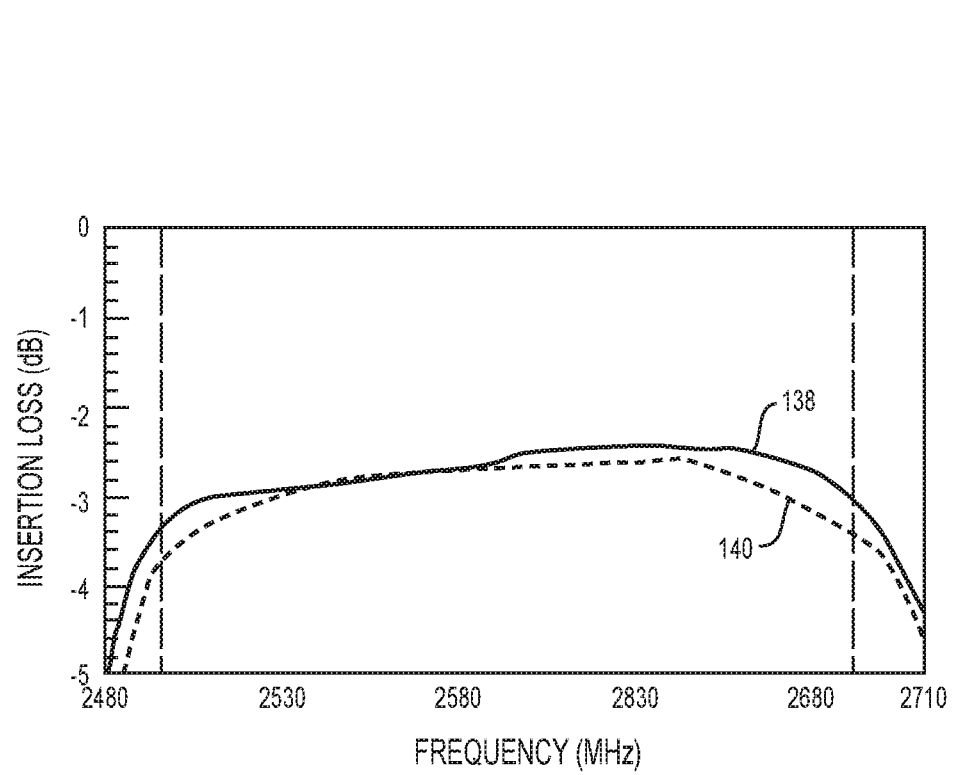
FIG. 4A is a graphic diagram providing an exemplary illustration of insertion loss improvement achieved by the RF circuit of FIG. 3 over the RF circuit of FIG. 2.

By employing the TDD receive filter 76R and the TDD transmit filter 76T as separate filter circuits, the RF circuit 74 may achieve certain performance improvements over the RF circuit 16 of FIG. 2. In this regard, FIG. 4A is a graphic diagram 136 providing an exemplary illustration of insertion loss improvement achieved by the RF circuit 74 of FIG. 3 over the RF circuit 16 of FIG. 2.

The graphic diagram 136 includes a first curve 138 and a second curve 140 that correspond to an insertion loss of the TDD receive filter 76R in FIG. 3 and an insertion loss of the LTE-B41 receive-transmit filter in FIG. 2, respectively. The first curve 138 shows that the TDD receive filter 76R can provide approximately 0.4 dB insertion loss improvement over the LTE-B41 receive-transmit filter. The improvement in the insertion loss may be attributed to the lower rejection requirement for the TDD receive filter 76R compare to the LTE-B41 receive-transmit filter.

Figure 4B:
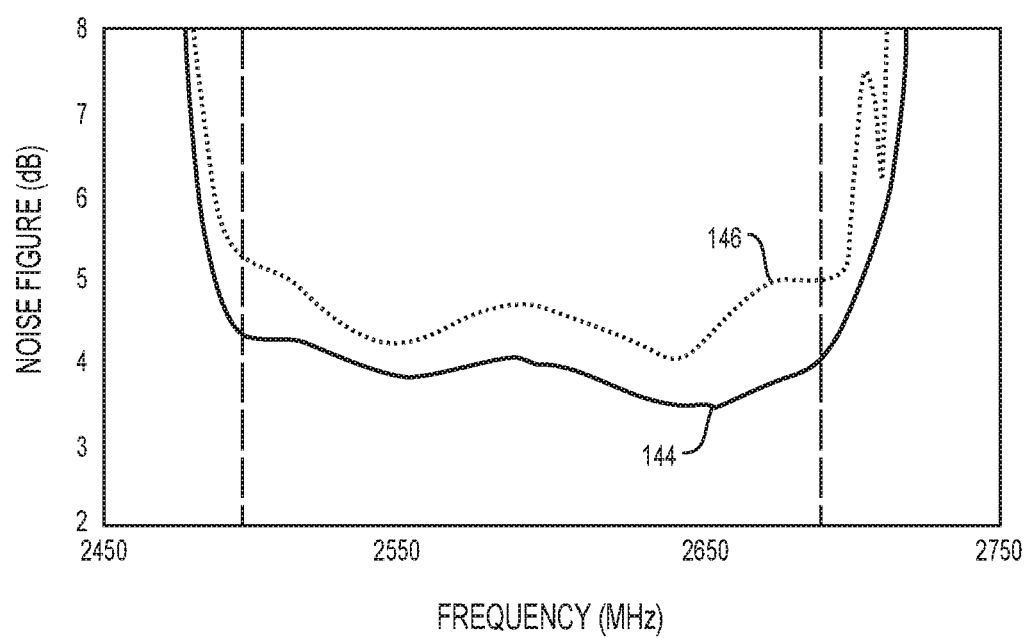
FIG. 4B is a graphic diagram providing an exemplary illustration of noise figure improvement achieved by the RF circuit of FIG. 3 over the RF circuit of FIG. 2.

FIG. 4B is a graphic diagram 142 providing an exemplary illustration of noise figure improvement achieved by the RF circuit 74 of FIG. 3 over the RF circuit 16 of FIG. 2. The graphic diagram 142 includes a first curve 144 and a second curve 146 that correspond to a noise figure of the TDD receive filter 76R in FIG. 3 and a noise figure of the LTE-B41 receive-transmit filter in FIG. 2, respectively. The first curve 144 shows that the TDD receive filter 76R can provide approximately 1 dB noise figure improvement over the LTE-B41 receive-transmit filter. The overall improvement in the noise figure may be attributed to three improvements. The first improvement is a result of the lower rejection requirement for the TDD receive filter 76R compare to the LTE-B41 receive-transmit filter. The second improvement is achieved by connecting the TDD receive filter 76R directly to the TDD band LNA 80 without any switch in between the TDD receive filter 76R and the TDD band LNA 80. The third improvement is achieved by concurrently presenting the desired power amplifier (PA) impedance $Z_1$ and the desired LNA impedance $Z_2$ to the high-band power amplifier 34 and the LTE-B41 LNA 70, respectively.

Those skilled in the art will recognize improvements and modifications to the preferred embodiments of the present disclosure. All such improvements and modifications are considered within the scope of the concepts disclosed herein and the claims that follow.

What is claimed is:

1. A radio frequency (RF) circuit comprising:
   a time-division duplex (TDD) receive filter coupled to a TDD band low-noise amplifier(LNA) and configured to:
   receive a TDD RF receive signal in a TDD band; and
   pass the TDD RF receive signal to the TDD band LNA;
   a TDD transmit filter configured to:
   receive a TDD RF transmit signal in the TDD band from a high-band power amplifier (PA); and
   pass the TDD RF transmit signal to a front-end circuit;
   a first filter bank comprising at least one first frequency-division duplex (FDD) receive filter configured to:
   receive at least one first FDD RF receive signal in at least one first FDD receive band;
   pass the at least one first FDD RF receive signal to at least one first FDD band LNA;
   at least one TDD transmit-receive filter configured to receive at least one second TDD RF receive signal in at least one second TDD band and pass the at least one second TDD RF receive signal to at least one second TDD band LNA;
   a second filter bank comprising at least one second FDD receive filter configured to:
   receive at least one second FDD RF receive signal in at least one second FDD receive band;
   pass the at least one second FDD RF receive signal to at least one second FDD band LNA; and
   a third filter bank comprising at least one third FDD receive filter configured to:
   receive at least one third FDD RF receive signal in at least one third FDD receive band;
   pass the at least one third FDD RF receive signal to at least one third FDD band LNA;
   wherein the TDD receive filter and the TDD transmit filter are provided in separate dies and configured based on different insertion loss, interference rejection, and impedance match requirements.

2. The RF circuit of claim 1 wherein the TDD receive filter is further configured to receive the TDD RF receive signal concurrent to a selected FDD receive filter among the at least one first FDD receive filter, the at least one second FDD receive filter, and the at least one third FDD receive filter being configured to receive a selected FDD RF receive signal among the at least one first FDD RF receive signal, the at least one second FDD RF receive signal, and the at least one third FDD RF receive signal in a selected FDD receive band among the at least one first FDD receive band, the at least one second FDD receive band, and the at least one third FDD receive band.

3. The RF circuit of claim 1 wherein the TDD receive filter is connected directly to the TDD band LNA without going through a switch.

4. The RF circuit of claim 1 wherein the TDD receive filter is further configured to receive the TDD RF receive signal concurrent to the at least one TDD transmit-receive filter being configured to receive the at least one second TDD RF receive signal in the at least one second TDD band.

5. The RF circuit of claim 1 wherein the TDD receive filter is further configured to receive the TDD RF receive signal in a long-term evolution (LTE) band 41 (LTE-B41) band and pass the TDD RF receive signal to an LTE-B41 LNA.

6. The RF circuit of claim 5 wherein:
the at least one first FDD receive filter comprises:
an LTE band 1 (LTE-B1) receive filter configured to receive an LTE-B1 RF receive signal in an LTE-B1 receive band and pass the LTE B1 RF receive signal to an LTE-B1 LNA; and
an LTE band 3 (LTE-B3) receive filter configured to receive an LTE-B3 RF receive signal in an LTE-B3 receive band and pass the LTE-B3 RF receive signal to an LTE-B3 LNA;
the at least one second FDD receive filter comprises:
an LTE band 25 (LTE-B25) receive filter configured to receive an LTE-B25 RF receive signal in an LTE-B25 receive band and pass the LTE B-25 RF receive signal to an LTE-B25 LNA;
an LTE band 66 (LTE-B66) receive filter configured to receive an LTE-B66 RF receive signal in an LTE-B66 receive band and pass the LTE-B66 RF receive signal to an LTE-B66 LNA;
the at least one third FDD receive filter comprises an LTE band 30 (LTE-B30) receive filter configured to receive an LTE-B30 RF receive signal in an LTE-B30 receive band and pass the LTE-B30 RF receive signal to an LTE-B30 LNA; and
the at least one TDD transmit-receive filter comprises an LTE band 40 (LTE-B40) transmit-receive filter configured to receive an LTE-B40 RF receive signal in an LTE-B40 band and pass the LTE-B40 RF receive signal to an LTE-B40 LNA.

7. The RF circuit of claim 6 wherein the TDD receive filter is further configured to receive the TDD RF receive signal concurrent to a selected FDD receive filter among the LTE-B1 receive filter, the LTE-B3 receive filter, the LTE-B25 receive filter, the LTE-B66 receive filter, and the LTE-B30 receive filter being configured to receive a selected FDD RF receive signal among the LTE-B1 RF receive signal, the LTE-B3 RF receive signal, the LTE-B25 RF receive signal, the LTE-B66 RF receive signal, and the LTE-B30 RF receive signal in the selected FDD receive band among the LTE-B1 receive band, the LTE-B3 receive band, the LTE-B25 receive band, the LTE-B66 receive band, and the LTE-B30 receive band.

8. The RF circuit of claim 6 wherein the TDD receive filter is further configured to receive the TDD RF receive signal concurrent to the LTE-B40 receive-transmit filter being configured to receive an LTE-B40 RF receive signal in the LTE-B40 band.

9. The RF circuit of claim 6 wherein the first filter bank further comprises an LTE band 32 (LTE-B32) receive filter configured to receive an LTE-B32 RF receive signal in an LTE-B32 receive band and provide the LTE-B32 RF receive signal to an LTE-B32 LNA.

10. The RF circuit of claim 6 wherein the LTE-B40 receive-transmit filter is further configured to receive an LTE-B40 RF transmit signal in the LTE-B40 band and pass the LTE-B40 RF transmit signal to the front-end circuit.

11. The RF circuit of claim 1 wherein the TDD receive filter is further configured to receive the TDD RF receive signal in a LTE band 40 (LTE-B40) band and pass the TDD RF receive signal to an LTE-B40 LNA.

12. The RF circuit of claim 1 wherein:
the TDD transmit filter is coupled to the high-band PA via a TDD transmit switch; and
the TDD receive filter is coupled to the TDD band LNA via a TDD receive switch independent from the TDD transmit switch.

13. The RF circuit of claim 1 wherein the TDD receive filter and the TDD transmit filter are further configured to concurrently present a desired LNA impedance and a desired PA impedance to the TDD band LNA and the high-band PA, respectively.

14. The RF circuit of claim 1 wherein:
the first filter bank comprises at least one first FDD transmit filter configured to receive at least one first FDD RF transmit signal in at least one first FDD transmit band from a mid-band PA and pass the at least one first FDD RF transmit signal to the front-end circuit;
the first filter bank comprises at least one second FDD transmit filter configured to receive at least one second FDD RF transmit signal in at least one second FDD transmit band from the mid-band PA and pass the at least one second FDD RF transmit signal to the front-end circuit; and
the third filter bank comprises at least one third FDD transmit filter configured to receive at least one third FDD RF transmit signal in at least one third FDD transmit band from the high-band PA and pass the at least one third FDD RF transmit signal to the front-end circuit.

15. The RF circuit of claim 14 wherein the at least one TDD transmit-receive filter is further configured to receive at least one second TDD RF transmit signal in the at least one second TDD band from the high-band PA and pass the at least one second TDD RF transmit signal to the front-end circuit.

16. The RF circuit of claim 14 wherein:
the first filter bank comprises:
an LTE band 1 (LTE-B1) transmit filter configured to receive an LTE-B1 RF transmit signal in an LTE-B1 transmit band and pass the LTE B1 RF receive signal to the front-end circuit; and
an LTE band 3 (LTE-B3) transmit filter configured to receive an LTE-B3 RF transmit signal in an LTE-B3 transmit and pass the LTE-B3 RF transmit signal to the front-end circuit;
the second filter bank comprises:
an LTE band 25 (LTE-B25) transmit filter configured to receive an LTE-B25 RF transmit signal in an LTE-B25 transmit band and pass the LTE B-25 RF transmit signal to the front-end circuit;
an LTE band 66 (LTE-B66) transmit filter configured to receive an LTE-B66 RF transmit signal in an LTE-B66 transmit band and pass the LTE-B66 RF transmit signal to the front-end circuit; and the third filter bank comprises an LTE band 30 (LTE-B30) transmit filter configured to receive an LTE-B30 RF transmit signal in an LTE-B30 transmit band and pass the LTE-B30 RF transmit signal to the front-end circuit.

17. The RF circuit of claim 1 wherein the TDD receive filter is further configured to receive the TDD RF transmit signal in a long-term evolution (LTE) band 41 (LTE-B41) band and pass the TDD RF transmit signal to the front-end circuit.

18. The RF circuit of claim 1 wherein the TDD receive filter is further configured to receive the TDD RF transmit signal in a LTE band 40 (LTE-B40) band and pass the TDD RF transmit signal to the front-end circuit.

19. The RF circuit of claim 1 wherein the TDD receive filter and the TDD transmit filter are integrated into a single die.

* * * * *